United States Patent [19]

Inkel

[11] Patent Number: 4,572,462

[45] Date of Patent: Feb. 25, 1986

[54] APPARATUS FOR TRANSFERRING MATERIAL FROM A FEED SPOOL TO A TAKE-UP SPOOL

[75] Inventor: Marcel Inkel, Colchester, Conn.

[73] Assignee: Placo Molders Inc., Bloomfield, Conn.

[21] Appl. No.: 543,042

[22] Filed: Oct. 18, 1983

[51] Int. Cl.[4] .......................... B41J 35/28; G03B 1/04

[52] U.S. Cl. .................................. 242/199; 400/208.1; 400/236

[58] Field of Search ................................ 242/197-200, 242/75-75.4, 156; 360/96.1, 132; 400/207, 236-236.2, 208.1; 226/60, 61, 195

[56] References Cited

U.S. PATENT DOCUMENTS

| | | | |
|---|---|---|---|
| 738,935 | 9/1903 | Pike . | |
| 826,481 | 7/1906 | Donning . | |
| 1,135,702 | 4/1915 | Larson | 242/156 |
| 1,399,480 | 12/1921 | Helmond . | |
| 2,406,846 | 9/1946 | Muller | 242/9 |
| 2,560,564 | 7/1951 | Foster et al. | 242/199 X |
| 2,685,417 | 8/1954 | Bartelson | 242/75 |
| 3,670,986 | 6/1972 | Farkas | 242/107.1 |
| 3,842,620 | 10/1974 | Scozzafava | 188/83 X |
| 4,010,839 | 3/1977 | Guerrini et al. | 400/208 |
| 4,013,160 | 3/1977 | Colecchi et al. | 242/75.45 X |
| 4,026,492 | 5/1977 | Kern | 242/75.2 |
| 4,058,197 | 11/1977 | West | 242/75.4 X |
| 4,074,799 | 2/1978 | Hishida et al. . | |
| 4,408,913 | 10/1983 | Frechette | 400/208 |

*Primary Examiner*—Leonard D. Christian
*Attorney, Agent, or Firm*—John J. Byrne; Bradford E. Kile; Kevin M. O'Brien

[57] ABSTRACT

An apparatus for transferring material wound on a feed spool to a take-up spool such as in a ribbon cassette for a typewriter or word processor. The apparatus includes a base, a centerpost, a feed spool positioned to rotate about the centerpost, a take-up spool, and a generally circular coil spring attached at one end to the centerpost. The outer surface of the spring exerts a frictional drag force on the feed spool which resists rotation of the spool during a transfer procedure. The spring also deforms during the transfer procedure and exerts a force on the spool in a direction opposite to the direction of rotation thereby providing a minimum tension on the material to avoid problems common to conventional cassettes such as jamming.

10 Claims, 5 Drawing Figures

APPARATUS FOR TRANSFERRING MATERIAL FROM A FEED SPOOL TO A TAKE-UP SPOOL

BACKGROUND OF THE INVENTION

This invention relates to an improved apparatus for dispensing wound material. More particularly, this invention relates to an apparatus for dispensing material on a feed spool to a take-up spool by rotating the feed spool in the direction opposite to the direction in which the material is wound.

The basic concept of an apparatus for transferring wound material from a feed spool to a take-up spool is to act in cooperation with a machine which will operably engage the material during the time the material passes between the two spools. In the case of a ribbon cassette, the ribbon may be contacted by a printing device of a typewriter, a word processor, a computer printer, and the like.

A threshold or common denominator of almost all devices for transferring wound material between feed and take-up spools is a smooth and orderly transfer of the material. A common problem encountered in such devices is the occurance of material jamming along the path between the spools which causes a temporary or permanent delay in a transfer procedure. For instance, an operator of a typewriter or word processor, after inserting a ribbon cassette into a machine, may be unable to properly operate the machine because of jamming of the ribbon cassette. In such event, the operator must remove the cassette from the machine and either attempt to resolve the jam, often by sacrificing some length of fresh ribbon, or dispose of the cassette with fresh ribbon remaining on the feed spool. Such a procedure is troublesome both in terms of the time spent in correcting the problem and in the cost of the cassette itself.

Over the years the business machines industry has attempted to reduce jamming in ribbon cassettes and other such devices in order to improve product performance and reliability. The proper amount of ribbon feed is generally dictated by drive gears on a take-up side of the cassette. Jamming frequently occurs at a printing area when the ribbon unwinds from the feed spool at a rate which is faster than the rate at which the ribbon is wound upon the take-up spool. To correct this problem, many cassettes and other such devices now include frictional drag means which are positioned against the rotating feed spool in order to prevent pulling an excess amount of ribbon from the supply side of the cassette.

Devices attempting to produce a frictional drag on the feed spool have included such drag means as foamy material, o-rings, and springs which apply force directly to the ribbon itself. However, serious advantages are associated with these means. Foam is inconsistent because it is directly effected by the width of the material on the feed spool, and o-rings can be adversely affected by heat degradation. Springs which act directly on the ribbon itself apply a force which changes drastically as the ribbon diameter decreases. The ribbon may also suffer contamination from oily sustances on the spring which may not be removed by the manufacturer.

While such systems, as previously noted, have received at least a degree of industry recognition, room for significant improvement remains. In this regard, the absence of any preventative means increases the frequency of material jamming and results in loss of operator time and money. However, the above-mentioned means for producing a frictional drag on the feed spool also includes serious disadvantages such as inconsistency of drag, heat sensitivity and contamination of the ribbon.

The problems suggested in the proceeding are not intended to be exhaustive, but rather are among many which may tend to reduce the effectiveness of prior devices for transferring material between a feed spool and a take-up spool.

Other noteworthy problems may also exist; however those presented above should be sufficient to demonstrate that devices which transfer material between a feed spool and a take-up spool have not been altogether satisfactory.

OBJECTS AND SUMMARY OF THE INVENTION

It is, therefore, a general object of the invention to provide an apparatus for transferring material between a feed spool and a take-up spool which will obviate or minimize problems of the type previously described.

It is a particular object of the invention to provide a ribbon cassette which transfers ribbon from a feed spool to a take-up spool and which reduces ribbon jam.

It is another object of the invention to provide an economical ribbon cassette which may be utilized in a wide variety of machines such as typewriters, word processors, computer printers and the like.

It is yet another object of the invention to provide a ribbon cassette which includes means to produce a frictional drag on the feed spool and to maintain a minimum tension on the ribbon which means applies a relatively consistent drag force on the feed spool throughout the transfer of the ribbon from the feed spool to the take-up spool.

It is still another object of the invention to provide a ribbon cassette which includes means to produce a frictional drag on the feed spool and to maintain a minimum tension on the ribbon, which means is relatively resistant to heat fluctuations and which means does not contaminate the ribbon.

BRIEF SUMMARY OF THE INVENTION

One preferred embodiment of the invention which is intended to accomplish at least some of the foregoing objects resides in an apparatus for transferring material from a feed spool to a take-up spool that is rotated by a machine with which the material is used comprising: a base; a centerpost; a feed spool having an annular core rotatably received about said centerpost, and having an outer surface upon which the material is wound in a first direction, and which is operable to transfer the material upon rotation of said feed spool in a second direction opposite to the direction in which the material is wound; a take-up spool receiving the material transferred from said feed spool by winding the material about said take-up spool; and a generally circular coil spring interposed between said centerpost and said core having its outer surface in frictional engagement with the inner surface of said core.

In a preferred embodiment of the present invention a ribbon cassette includes a cover having fastening means; a base having means to receive said fastening means from said cover; a centerpost extending from said base; a feed spool having an annular core rotatably received about said centerpost, and having an outer surface upon which the material is wound in a first direction, and which is operable to transfer the material upon rotation of said feed spool in a second direction opposite to the direction in which the material is wound; a take-up spool receiving the material transferred from said feed spool by winding the material about said take-up spool; and a generally circular coil spring interposed between said centerpost and said core having its outer surface in frictional engagement with the inner surface of said core.

In a specific embodiment of this invention, the frictional engagement spring comprises a metalic generally circular coil spring which is fixed at one end to the centerpost and which extends from the centerpost and along the inner surface of the spool core in the same direction as the spool in unwound.

THE DRAWINGS

Other objects and advantages of the present invention will become more apparent from the following detailed description of a preferred embodiment taken in conjunction with the accompanying drawings, wherein.

DETAILED DESCRIPTION

Figure 1:
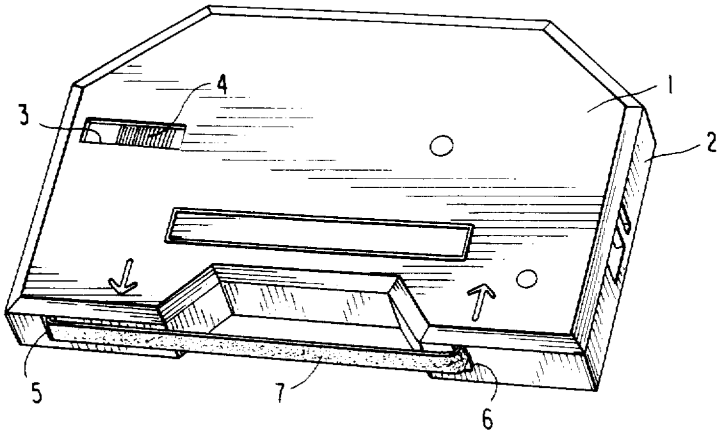
FIG. 1 is an axonometric view of an assembled ribbon cassette which discloses an operative environment of the subject invention.

Referring now to FIG. 1, an axonometric view can be seen of a ribbon cassette assembled for use in a machine such as a typewriter, word processor or computer printer. In this regard, a cover 1 is attached to the base of a tape cassette 2. The cover 1 contains an opening 3 through which an operator may view a ribbon feed spool 4 to determine the amount of ribbon remaining on the spool. The base contains openings 5 and 6 through which a ribbon 7 exits and enters the cassette as the ribbon is transferred from the feed spool 4 to a take-up spool.

Figure 4:
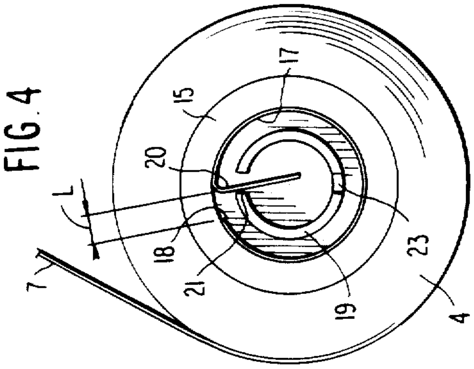
FIG. 4 is an enlarged detail view of a feed spool of FIG. 2 illustrating the position of a circular coil spring and centerpost when no tension is applied to a ribbon.
Figure 5:
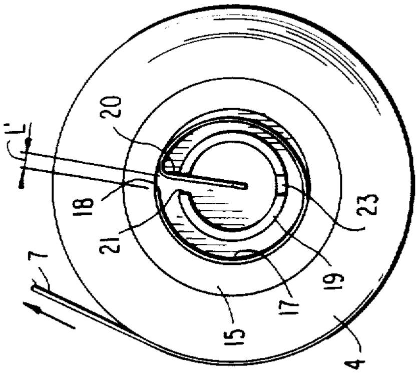
FIG. 5 is a detail view similar to FIG. 4 when tension is applied to the ribbon and the feed spool is transferring ribbon to a take-up spool.
Figure 2:
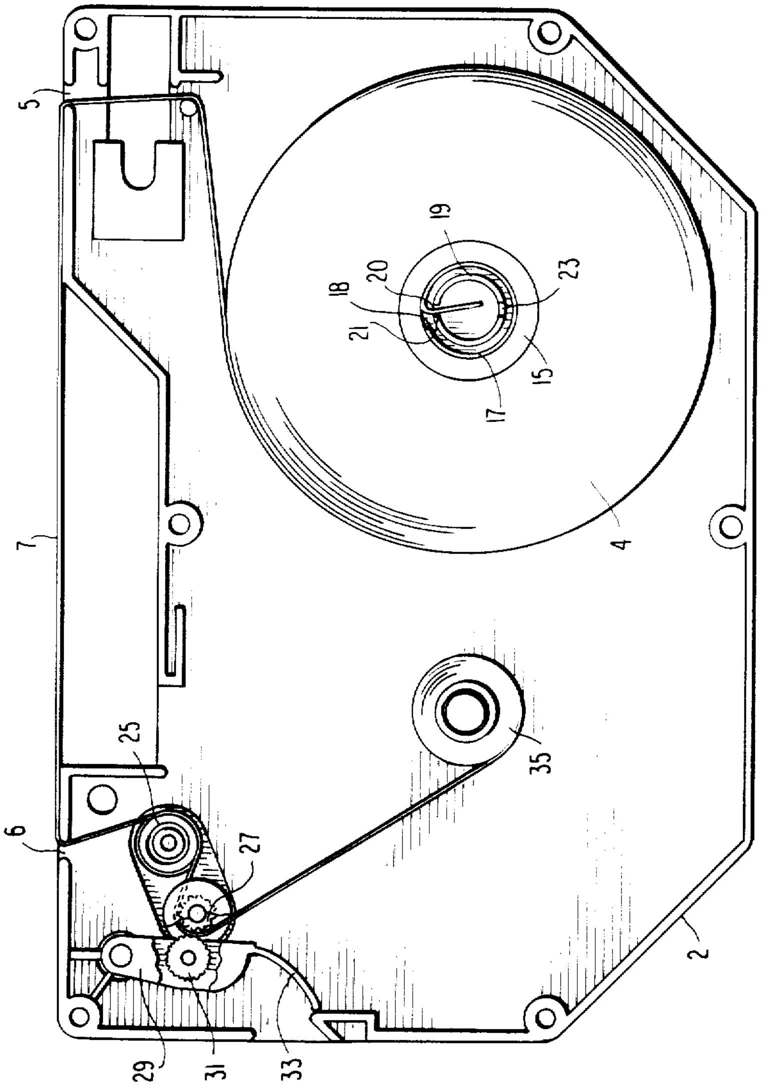
FIG. 2 is a top view of an internal assembly of a ribbon cassette in accordance with a preferred embodiment of the subject invention.

Referring now to FIGS. 2, 4 and 5 it will be seen that the ribbon feed spool 4 is wound upon a plastic spool core 15. A metal coil spring 17 is inserted into an annular chamber in the spool core so that the spring generally conforms to the shape of the inner surface of the spool core and contacts the spool core at a plurality of points. The ribbon assembly is then inserted into the cassette by fixing a non-flexible end of the spring 20 to a centerpost 19. As can be seen from the drawings, sufficient space must be maintained between the centerpost and the spool core to permit rotation of the spool around the centerpost. This arrangement is obtained by hooking a fixed end of the spring into a slot 21 in the centerpost. This slot may also serve, with slot 23 on the opposite side of the centerpost, to accept a stabilizing rib in the cover 1 which prevents the spool assembly from riding off the centerpost.

Figure 3:
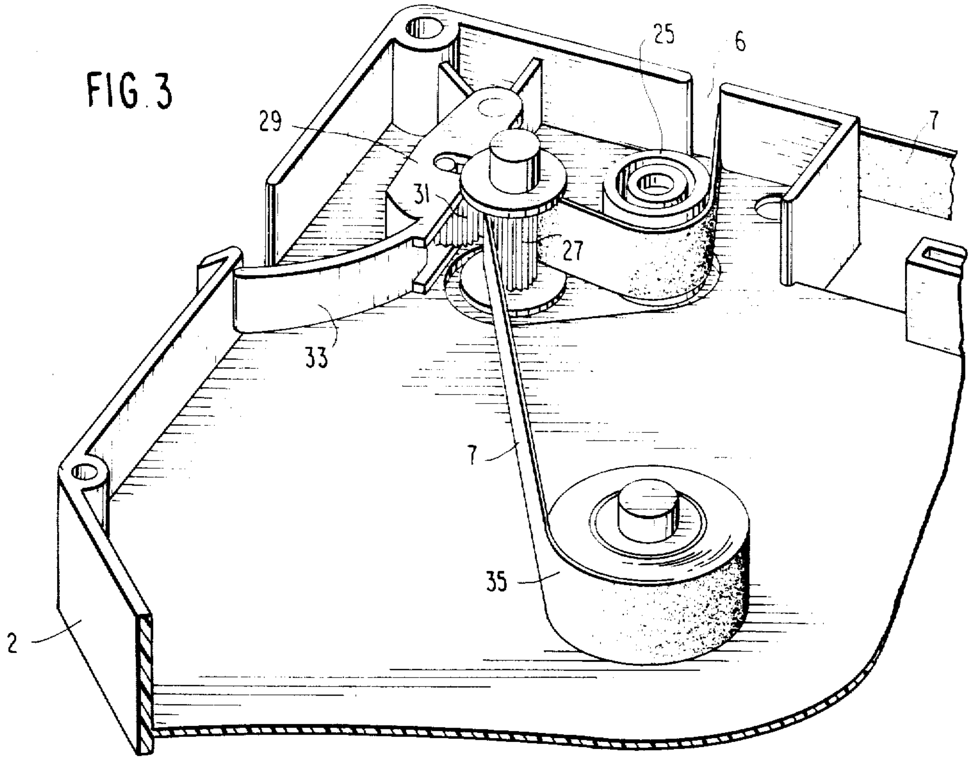
FIG. 3 is a side view of a drive means of the ribbon cassette disclosed in FIG. 2.

The take-up side of the cassette, which dictates the proper rate of ribbon transfer, is illustrated in FIGS. 2 and 3. During operation, a drive gear 27 and a take-up spool 35 are rotated by drive mechanisms in the machine printer. The ribbon is guided through entrance groove 6 and past an idle roller 25 to the rough outer surface of the drive gear. At this location the ribbon is contacted on one side by the rotating drive gear and on the other side by by the rough surface of a feed gear 31, shown here as a spiked wheel, and is directed to the rotating take-up spool 35. The feed gear is held in place by a retainer 29, a top portion of which is removed in FIG. 2 for ease of illustration and is pressured against the ribbon and the drive gear by retainer leg 33.

Referring to FIGS. 4 and 5, the operation of the feed spool assembly is shown in detail at a position of no tension on the ribbon and at a position of tension on the ribbon during normal operative rotation and unwinding of the ribbon spool. The generally circular coil spring 17 is positioned in the annular spool core so that the direction of the flexible end 18 matches the direction of rotation of the spool during ribbon transfer. This arrangement provides for a consistent frictional resistance against rotation of the spool in the direction of ribbon transfer and also provides for a degree of resilient deformation of the spring during rotation, note FIG. 5.

The feed spool assembly is inserted into the cassette and is fixed to the centerpost by hooking the nonflexible end of spring 20 around the centerpost slot 21. Prior to the rotation of the feed spool, the feed spool assembly appears as illustrated in FIG. 4 with the distance between the flexible end of the spring 18, and the fixed end of spring 20 indicated as distance L. Upon rotation of the feed spool in the direction of ribbon transfer, the spring exerts a frictional resistance on the plastic spool core 15 which reduces the likelihood of excess ribbon supply and jamming. However, the spring further reduces the likelihood of jamming by maintaining a minimum tension on the ribbon. As illustrated in FIG. 5, the spring deforms during rotation of the spool, with the distance (L') between the flexible end of spring and the fixed end of the spring reduced from the non-tension distance (L). The spring deformation occurs because the spring is designed so that as the ribbon spool rotates, the spring rotates to a point of frictional slippage. If the drive force is removed from the ribbon while the spring is in the deformed position as when the machine printing is interrupted or when the cassette is removed, the spring counter-rotates the spool a slight amount back in the direction opposite to that of unwinding.

The distance which the spring forces the spool to rotate back depends upon the extent of deformation of the drag spring. To increase the degree of backward rotation, the spring could have multiple coils and rotate a greater distance before slipping. This action assures that there must always be a minimum of required tension on the ribbon itself before the ribbon unwinds from the feed spool.

Having described in detail a preferred embodiment of the invention and before continuing with the claim portion of the specification; it may be useful to briefly set forth some of the major advantages of the invention.

SUMMARY OF MAJOR ADVANTAGES OF THE INVENTION

In describing an apparatus for transferring material wound on a feed spool to a take-up spool for rotating the feed spool in accordance with a preferred embodiment of the invention; those skilled in the art will recognize several advantages which singularly distinguish the subject invention from the heretofore known prior art.

Prior devices of this type have kept tension on the ribbon by applying force to the loose ribbon itself. The apparatus of the subject invention does not touch the ribbon, but does permit the entire spool to rotate.

A particular advantage of the subject invention is that this device reduces if not eliminates jamming caused by excessive material unwinding from the feed spool. Prior known devices which restricted rotation of the feed spool encountered serious problems. Unlike some prior systems, the subject maintains a relatively constant degree of resistance throughout an unwinding procedure. Although the amount of force required to pull the material from the spool increases as the spool diameter decreases, the amount of force required when the spool is full is small so that the change is negligible.

Other advantages associated with the subject invention are that the spring is relatively heat resistant and will not degrade over a wide temperature range, and also that the drag spring does not directly contact the ribbon and therefore avoids problems of contamination.

Yet another siginificant advantage of the subject invention involves wear on the spool core as it is contacted by the spring. Unlike prior devices in which wear of the spool core is detrimental, such wear is advantageous to the subject invention because less force is required to rotate the spool when the spool diameter is small.

In describing the invention, reference has been made to a preferred embodiment. Those skilled in the art, however, and familiar with the disclosure of the subject invention, may recognize additions, deletions, substitutions, and/or changes which will fall within the purview of the invention as defined in the following claims. In particular, it should be noted that any kind of resistance spring may be used for providing frictional contact.

I claim:

1. An apparatus for transferring material from a feed spool to a take-up spool that is rotated by a machine with which the material is used, said apparatus comprising:

a base;

a centerpost connected to said base;

a feed spool having an annular core mounted rotatably about said centerpost, and having an outer surface of said core operable to receive material wound in a first direction, and being further operable to transfer the material from said core upon rotation of said feed spool in a second direction opposite to the direction in which the material is wound upon said core;

a take-up spool connected to said base and being operable to receive the material transferred from said feed spool by winding the material about said take-up spool; and a generally circular coil spring interposed between said centerpost and said core having at least one portion but at most only two portions of its surface in continuous immediately adjacent abutment with a corresponding portion of an inner surface of said annular core;

said inner surface of said annular core being smooth, unobstructed, and concentrically circular with respect to said core, such that it has only a single circular surface;

said at least one but at most only two portions of said outer surface being in direct frictional engagement with said corresponding immediately abutted portion or portions of said smooth inner surface of said core; whereby the rate of rotation of the spool in the direction of transfer will be dampened by frictional interaction between said coil spring and the inner surface of said core and said coil spring will deform during material transfer such that upon termination of material transfer a degree of reverse rotation in the direction in which the material is wound upon said core will be imparted to said core.

2. The apparatus of claim 1 wherein said generally circular coil spring comprises;

an elongated end portion removably received in a radial bore on said centerpost for fixing said spring to said center post;

said spring extending from said radial bore on said centerpost and along the inner surface of said spool core in the same direction as the spool is rotated for material transfer.

3. A ribbon cassette comprising:

a cover having fastening means;

a base having means to receive said fastening means from said cover;

a centerpost connected to said base;

a feed spool having an annular core mounted rotatably about said centerpost, and having an outer surface of said core being operable to receive ribbon would in a first direction, and being further operable to transfer the ribbon from said core upon rotation of said feed spool in a second direction opposite to the direction in which the ribbon is wound upon said core;

a take-up spool connected to said base and being operable to receive the ribbon transferred from said feed spool by winding the ribbon about said take-up spool; and a generally circular coil spring interposed between said centerpost and said core having at least one portion but at most only two portions of its outer surface in continuous immediately adjacent abutment with a corresponding portion of an inner surface of said annular core;

said inner surface of said annular core being smooth, unobstructed, and concentrically circular with respect to said core, such that it has only a single circular surface;

said at least one but at most only two portions of said outer surface being in direct frictional engagement with said corresponding immediately abutted portion or portions of said smooth inner surface of said core; whereby the rate of rotation of the spool in the direction of transfer will be dampened by frictional interaction between said coil spring and the inner surface of said core and said coil spring will deform during ribbon transfer such that upon termination of ribbon transfer a degree of reverse rotation in the direction in which the material is wound upon said core will be imparted to said core.

4. The ribbon cassette of claim 3 wherein said generally circular coil spring comprises an elongated end portion removably received in a radial bore on said centerpost for fixing said spring to said centerpost;

said spring extending from said radial bore on said centerpost and along the inner surface of said spool core in the same direction as the spool is rotated for ribbon transfer.

5. An apparatus for transferring material from a feed spool to a take-up spool comprising:

a base;

a centerpost connected to said base;

a feed spool having an annular core mounted rotatably about said centerpost, said annular core having an inner surface and an outer surface, said outer surface of said annular core being operable to receive material would in a first direction and being further operable to transfer material upon rotation of said feed spool and said core in a second direction opposite to the direction in which the material is wound upon said core;

a take-up spool secured to said base and being operable to receive material transferred from said feed spool by winding said material about said take-up spool;

said inner surface of the annular core being smooth, unobstructed and concentrically circular with respect to said core such that it has only a single circular surface; and an annular resistance spring means having an outer surface at least one portion but at most only two portions of which are in continuous immediately adjacent abutment with a corresponding portion of said singular directioned smooth surface, for frictionally dampening the rate of rotation of the spool in the direction of transfer via frictional interaction with said inner surface; said at least one but at most only two portions of said outer surface being in frictional engagement directly with said corresponding immediately abutted portion or portions of said smooth inner surface;

said resistance spring means being interposed between said centerpost and said inner surface of said core, and having an end portion fixably attached to said centerpost.

6. An apparatus as defined in claim 5 wherein said apparatus further comprises a cover having fastening means and wherein said base includes means to receive said fastening means from said cover.

7. The structure of claim 5 wherein said resistance spring means comprises;

an elongated end portion removably received in a radial bore on said centerpost for fixing said spring to said centerpost;

said resistance means extending from said radial bore on said centerpost and along the inner surface of said spool core in the same direction as the spool is rotated for material transfer.

8. A structure according to claim 5 wherein a first end portion of said resistance spring means is fixably connected to said centerpost; an immediately adjacent portion of said resistance spring means extends radially and directly to said inner surface of said core; and remaining portion of said resistance spring means extends along said inner surface in frictional engagement therewith.

9. A structure according to claim 8 wherein said resistance spring means deforms in frictional engagement during rotation of said spool whereby said remaining portion is divided into a first portion in continuous immediate contact with said inner surface, a second portion also in continuous immediate contact with said inner surface, and a third portion between said first and second portion, which does not contact said inner surface at all; said second portion also being an end portion of said spring opposite said first end portion.

10. A structure according to claim 9 wherein said frist end portion of said resistance spring means is radially received in a radially directed bore on said centerpost.

* * * * *